United States Patent
Prelogar et al.

(10) Patent No.: US 10,425,716 B1
(45) Date of Patent: Sep. 24, 2019

(54) USER INTERFACE FOR AUDIO DEVICE

(71) Applicants: Barrett Prelogar, Kansas City, MO (US); Patsy Prelogar, Kansas City, MO (US)

(72) Inventors: Barrett Prelogar, Kansas City, MO (US); Patsy Prelogar, Kansas City, MO (US)

(73) Assignee: Piearcings, LLC, Kansas City, MO (US)

( * ) Notice: Subject to any disclaimer, the term of this patent is extended or adjusted under 35 U.S.C. 154(b) by 49 days.

(21) Appl. No.: 15/927,725

(22) Filed: Mar. 21, 2018

Related U.S. Application Data

(60) Provisional application No. 62/474,454, filed on Mar. 21, 2017.

(51) Int. Cl.
*H04R 1/10* (2006.01)
*G06F 3/041* (2006.01)

(52) U.S. Cl.
CPC .......... *H04R 1/1041* (2013.01); *G06F 3/041* (2013.01); *H04R 1/105* (2013.01); *H04R 1/1066* (2013.01)

(58) Field of Classification Search
CPC .......... H05K 1/16; H05K 1/111; H05K 1/147; H05K 1/162; H05K 1/189; H05K 3/28; G06F 3/041; G06F 3/044; G06F 3/0414; G06F 3/0416; G06F 3/048; H03K 17/9622; H03K 2217/96077; H03K 2217/960775; H03K 2217/960755; H04R 1/06; H04R 1/105; H04R 1/1041; H04R 1/1066
See application file for complete search history.

(56) References Cited

U.S. PATENT DOCUMENTS

| | | | | |
|---|---|---|---|---|
| 4,290,052 | A * | 9/1981 | Eichelberger | G06F 3/044 341/33 |
| 6,894,507 | B2 * | 5/2005 | Morimoto | G01R 27/2605 324/660 |
| 9,948,297 | B2 * | 4/2018 | Bruwer | H03K 17/955 |
| 2009/0260897 | A1 * | 10/2009 | Kruse | G06F 3/044 178/18.01 |
| 2010/0171723 | A1 * | 7/2010 | Kobayashi | G06F 3/0416 345/174 |
| 2011/0232976 | A1 * | 9/2011 | Osoinach | G06F 3/0418 178/18.06 |

* cited by examiner

*Primary Examiner* — Thang V Tran
(74) *Attorney, Agent, or Firm* — Erickson Kernell IP, LLC

(57) ABSTRACT

A user interface device useable with a wireless audio or audio/video device. The user interface device includes a layered configuration that includes a layer of sensors separated from an input plate by a compressible layer. Touch inputs from a user cause the input plate to be tilted or moved toward the sensors and to compress the compressible layer. The sensors are configured in an array such that variations in the tilt of the input plate and/or a distance between the input plate and the sensor is recognizable and useable to instruct operation of an associated device that is to be controlled via the touch inputs.

16 Claims, 5 Drawing Sheets

USER INTERFACE FOR AUDIO DEVICE

CROSS-REFERENCE TO RELATED APPLICATIONS

This application claims the benefit of U.S. Provisional Patent Application No. 62/474,454 filed Mar. 21, 2017 the disclosure of which is hereby incorporated herein in its entirety by reference.

BACKGROUND

Wireless technologies and miniaturization of computer hardware have exploded in recent years to enable a variety of new applications. One such application is the audio device or headphone. Traditional audio devices employed a pair of speakers tethered by respective wires to a single headphone jack, which could be plugged into an audio player or device. Subsequent audio devices eliminated the wires tethering the speakers to the audio player in lieu of wireless communications. Early wireless audio devices employed a wired connection between speaker units, but more recent technologies enable completely wireless and physically separate speaker units, which can be installed in or on the ear.

Interaction with such audio devices to control features such as audio playback, volume up/down, power on/of, and the like employ a variety of techniques. Most devices are paired or communicatively coupled to a mobile device such as a smartphone, computer, tablet, audio player or the like, the native controls on which can be employed to receive interactions and control audio output operations. Some device also include built-in hard switches, toggles, and other physically manipulated control devices while others include touch interfaces that may employ capacitive surfaces among other technologies to receive user inputs.

What is needed is an audio device with an improved touch-based interface for receiving and precisely sensing variations in user touch inputs.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a user-interface device for a wireless audio device.

The user-interface device is configured to receive a variety of touch-based inputs from a user that are useable by an associated computing device to control playback of audio files, among other tasks. The user-interface device includes a layered assembly of printed circuit board (PCB) components configured to sense an orientation and/or deformation of a ground plane component relative to an array of sensors. The PCB is arranged as a unitary component having a central body with satellite members coupled thereto via flexible arms. The central body houses a base ground plane along with any other desired components. A first satellite pad includes the array of sensors, such as capacitive touch sensors. A second satellite pad includes a relatively rigid or inflexible second ground plane.

To construct the user-interface device, the first satellite pad is folded onto the central body by flexing or folding the flexible arm therebetween and the second satellite pad is folded onto the second satellite pad. A dielectric material is provided between the central body and the first satellite pad and a compressible material is disposed between the first and second satellite pads. The user-interface device may be disposed within a housing and enclosed by a flexible cover.

In use, a user touches the flexible cover, which in turn depresses the second ground plane toward the sensors of the first satellite pad and compresses the material therebetween. Depending on the location of the user's touch on the second ground plane and the force of the touch, the second ground plane may be tilted or pivoted thus providing a unique pattern or set of sensors on the first satellite pad to indicate a sensed condition. These unique patterns and/or combinations of patterns are correlated to input commands which are then useable by the associated computing device as inputs.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about," "approximately," and "substantially" as used herein denote deviations from the exact value by +/−10%, preferably by +/−5% and/or deviations in the form of changes that are insignificant to the function.

With reference to FIGS. 3-6, a user-interface device 100 is described in accordance with an exemplary embodiment. The user-interface device 100 is described herein as being integrated into or used with audio and/or audio/video devices like wireless earbuds or headphones, however such is not intended to limit applications of the device 100;

embodiments of the device 100 might be employed with computing devices such as laptop computers, smartphones, tablet computers, MP3 players, as well as with other electronic devices like watches, cameras, health tracking devices, or the like.

Figure 1:
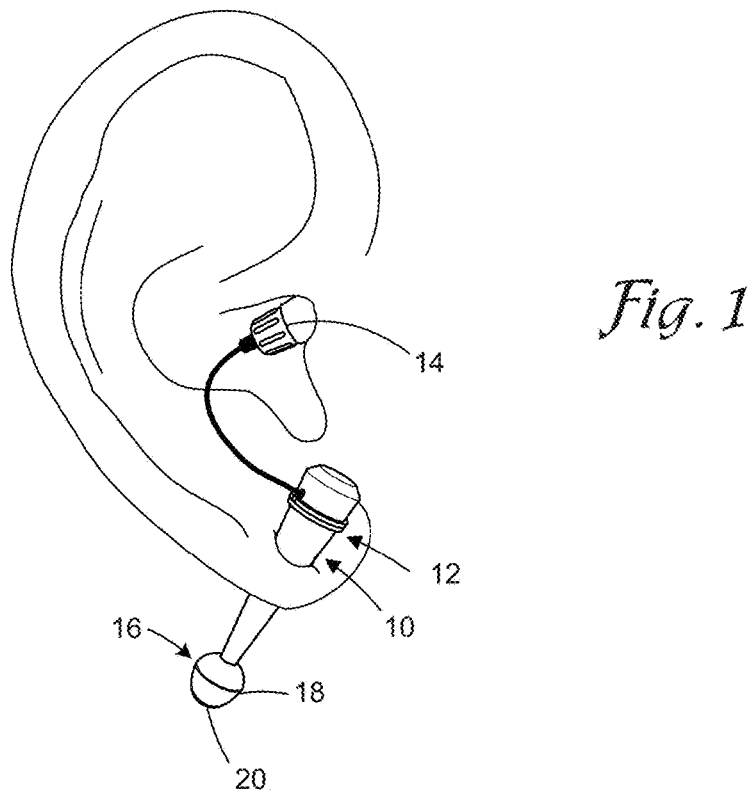
FIG. 1 is a perspective view of an exemplary audio device in which a user-interface device may be incorporated and used in accordance with an exemplary embodiment.
Figure 2:
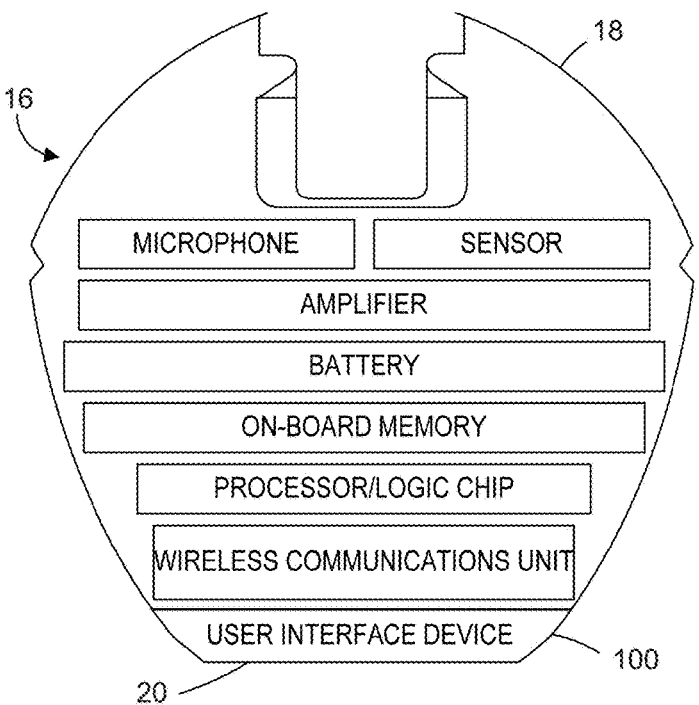
FIG. 2 is a block diagram depicting components of a control unit of the audio device of FIG. 1 depicting the user-interface device disposed therein along with other components in accordance with an exemplary embodiment.

One exemplary audio device 10 is depicted in FIGS. 1 and 2. The audio device 10 is configured as a taper-style earring that includes a body 12 having a generally conical form with an earbud 14 that is removably disposed within a first end thereof and a control unit 16 coupled to an opposite second end. The control unit 16 includes a housing 18 that is preferably configured in a spheroidal form but any desired form can be employed. A variety of components, including the user-interface device 100 can be disposed in the housing 18 and configured to enable operation of the audio device 10. As depicted in FIG. 2, such components may include a wireless communications unit, a processor or logic chip, an on-board memory, a battery, an amplifier, a microphone, a sensor, and/or a speaker or other sound-production device, among a variety of other components. Detail of those additional components as well as connections and communications therebetween is not necessary for conveying an understanding of exemplary embodiments and is not described in detail herein. Additional exemplary audio devices with which the user-interface device 100 may be employed are described by U.S. Pat. Nos. 9,084,054 and 9,888,309 both to Prelogar et al.

The user-interface device 100 provides or is associated with a control surface 20 on the control unit 16 through which inputs can be received from a user. The inputs can then be provided to the control unit 16 to control operation of the audio device 10 and/or a master device, such as a smartphone, or other computing device to which the audio device 10 is communicatively coupled.

The user-interface device 100 includes a plurality of components disposed on a printed circuit board (PCB) 104. The PCB 104 includes a control board 106 that is communicably coupled with an associated computing device or audio device. The control board 106 may include any variety of electronic components necessary for the operation of the device 100, e.g. to receive input signals, interpret those signals, and/or output or communicate the signals or commands interpreted from those signals to associated components of the associated audio device or computing device. The components on the control board 106 as well as other electronic components that may be included in the device 100 generally, e.g. transistors, capacitors, logic chips, memory, and the like, will be recognized by one of skill in the art and are thus not described in detail here.

The PCB 104 also includes a plurality of satellite pads including a base plane pad 108, a sensor pad 110, and an input plate pad 112. The satellite pads 108, 110, 112 are coupled to the control board 106 by flexible arms 114. The flexible arms 114 are sufficiently flexible to enable the pads 108, 110, and 112 to be folded onto the control board 106 which is disposed on and/or forms a central body 113 of the PCB 104. The flexible arms 114 can be formed from the same or different materials as the remainder of the PCB 104. The flexible arms 114 may be configured with differing lengths to account for their respective position within device 100 when each of the satellite pads is folded over and layered or stacked onto the control board 106.

The base plane pad 108 includes a conductive layer or coating that forms a base ground plane for the device 100. The base ground plane may be formed from a metallic layer, such as copper or alloy thereof, disposed on the base plane pad 108 or by other metals or materials available in the art.

Figure 3:
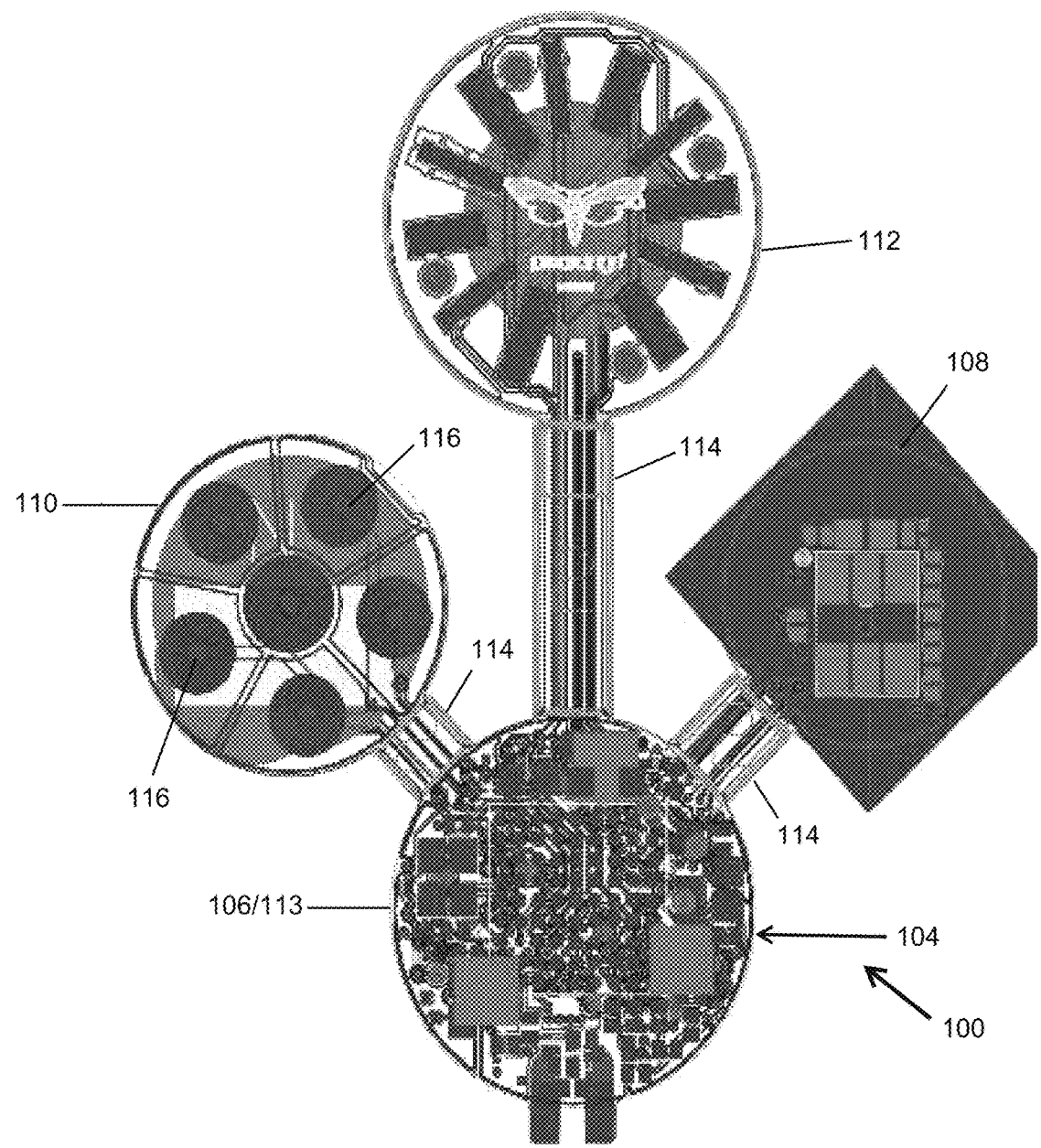
FIG. 3 is a schematic illustration of a top side of a circuit board for a user-interface device depicted in accordance with an exemplary embodiment.
Figure 4:
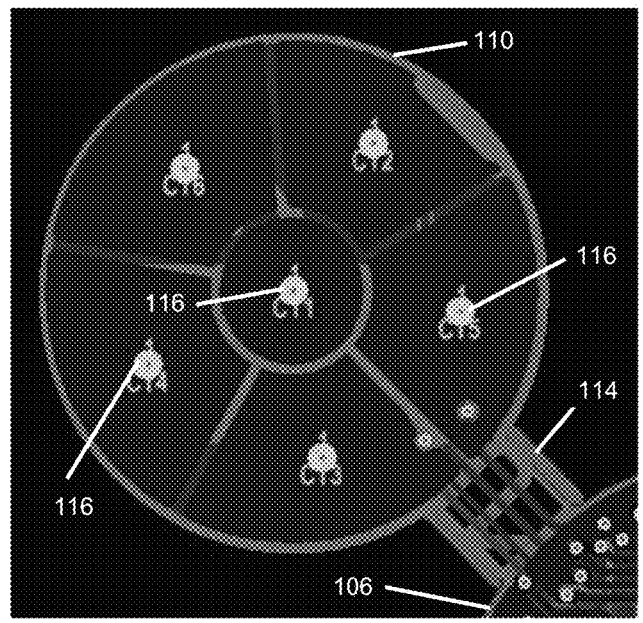
FIG. 4 is an enlarged view of a bottom side of a sensor pad of the circuit board depicted in FIG. 3.
Figure 5:
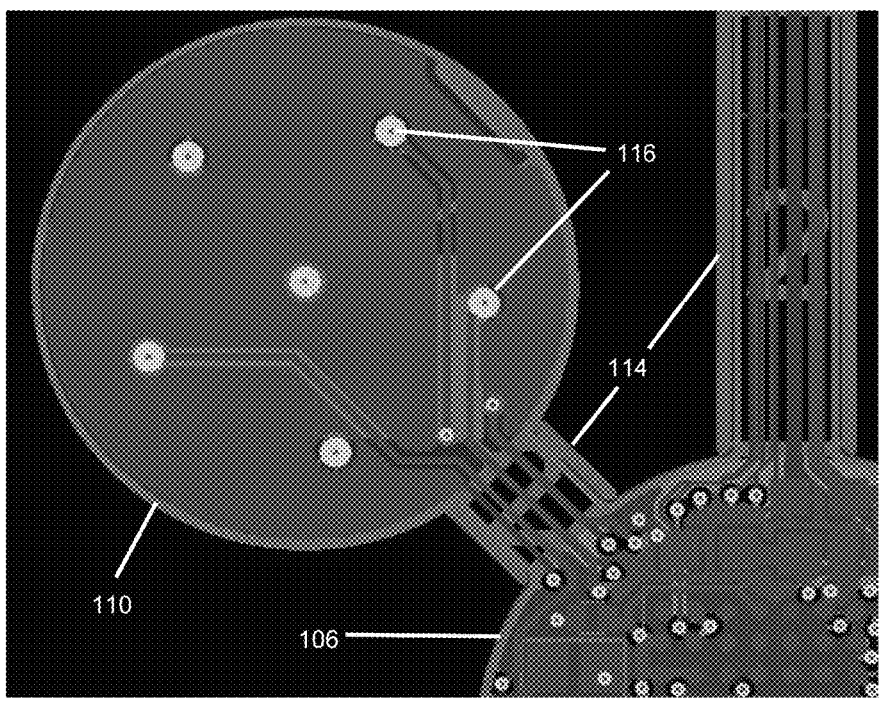
FIG. 5 is an enlarged view of a top side of the sensor pad of FIG. 4.

The sensor pad 110 includes an array of sensors 116. As depicted in FIGS. 3 and 4, the sensors 116 are arranged in a generally circular array with a plurality of the sensors 116 evenly spaced in a ring surrounding a central sensor 116, however the arrangement of the array is not so limited. The sensors 116 preferably comprise capacitive sensors configured to detect when a conductor is brought into sufficiently close proximity to the sensor 116, but other sensing technologies can be employed.

The input plate pad 112 comprises a generally rigid plate that may be comprised of a metal or other electrically conducting material or such conducting materials may be coated onto a surface of the input plate pad 112. In one embodiment, the input plate pad 112 is at least partially flexible to allow partial temporary deformation thereof when a sufficient force is applied thereto, e.g. the pad 112 may temporally bend or deflect and then return to an original shape when the force is removed.

Figure 6:
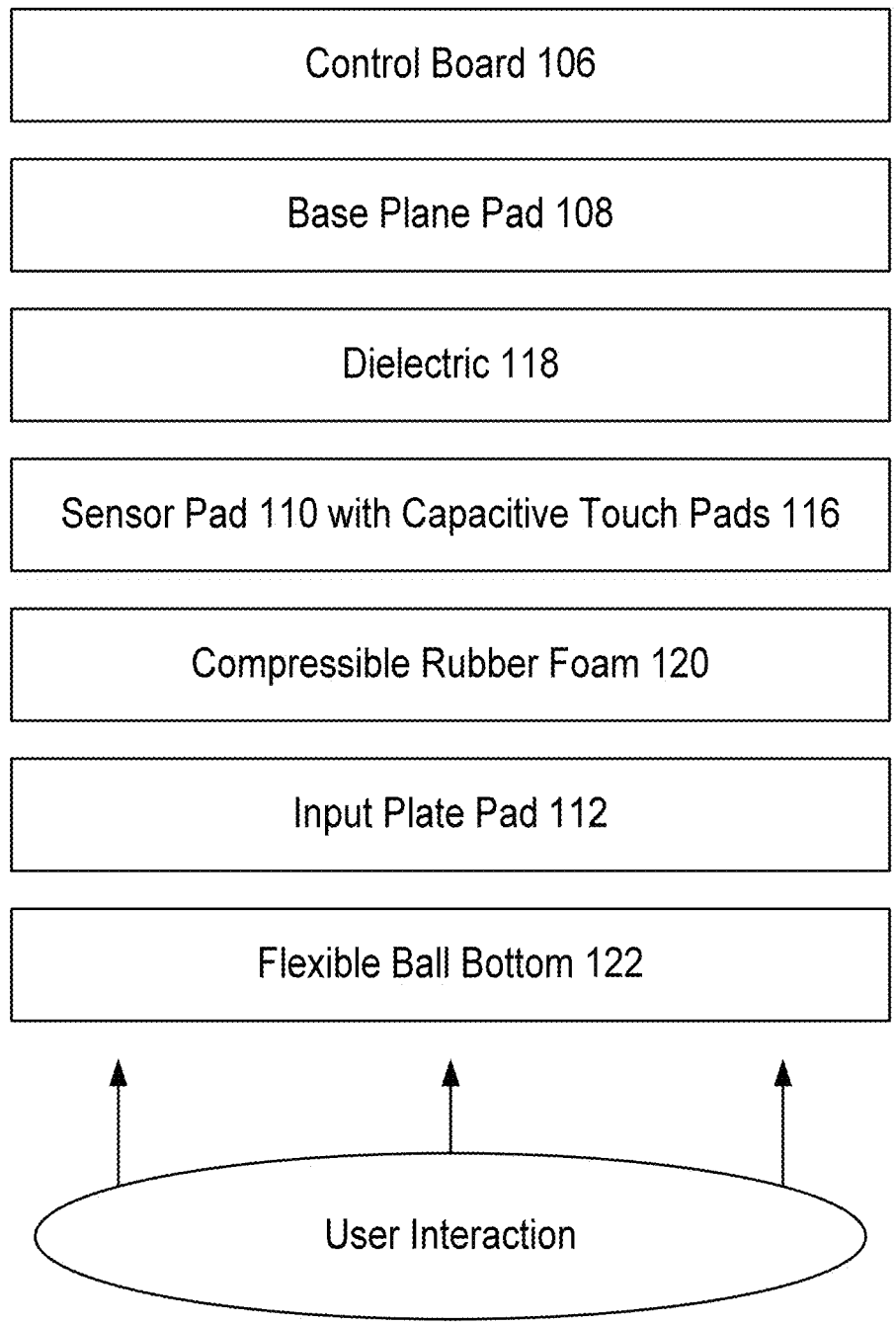
FIG. 6 is an illustrative diagram of layered components comprising a user-interface device depicted in accordance with an exemplary embodiment.

When installed in an audio, audio/video, or other device, the satellite pads 108, 110, 112 of the user-interface device 100 are folded onto the control board 106 to form a layered or stacked configuration, as depicted in FIG. 6. The base plane pad 108 is folded onto the control board 106. The sensor pad 110 is then folded onto the base plane pad 108. A dielectric material 118 is disposed on the base plane pad 108 and between the ground plane of the base plane pad 108 and the sensor pad 110. The dielectric material 118 may be deposited, coated, or otherwise disposed on the base plane pad 108. Alternatively, the dielectric material 118 can be similarly disposed on a bottom surface of the sensor pad 110 or simply disposed between the base plane pad 108 and the sensor pad 110 prior to folding the sensor pad 110 onto the base plane pad 108.

The input plate pad 112 is folded over the sensor pad 110. A cushion or compressible layer 120 comprising a rubber, foam, or similar material is disposed between the sensor pad 110 and the input plate pad 112. In one embodiment, the compressible layer 120 comprises a neoprene material. The compressible layer 120 may be coupled to one or both of the sensor pad 110 and input plate pad 112 via adhesives, mechanical engagement, or may rely on friction or entrapment for retention. The user interface device 100 is disposed, in the folded-up form, into a desired housing, like the housing 18. In another embodiment, the control board 106, the base plane pad 108, the sensor pad 110, and the input plate 112 are separate components that are stacked onto one another rather than being folded.

A flexible cover 122, like for example the control surface 20 of the audio device 10, is disposed over the device 100 to protect the device 100, and to enclose an opening in the housing, e.g. the housing 18, in which the device 100 is disposed. The cover 122 is sufficiently flexible to enable a touch by, for example, a finger of a user to cause the input plate pad 112 to be moved thereby, as described more fully below. The cover 122 may comprise a rubber, plastic, metal, composite, or other material or combination thereof. The device 100 may be configured to detect a very small flexure of the cover 122, for example flexure of the cover 122 that is so minute as to be imperceptible or nearly imperceptible by a user. Or the device 100 and the cover 122 may be configured to detect and/or receive a larger flexure or movement of the cover 122.

The compressible layer 120 has sufficient thickness to sufficiently insulate the sensors 116 from sensing the input plate pad 112 when in a normal state. In one embodiment, the sensors 116 may still sense the input plate pad 112 but at a level that can be employed as a baseline reading. The compressible layer 120 is also sufficiently compressible to enable the input plate pad 112 to be depressible toward the sensor pad 110 and sufficiently close thereto to enable sensing of the input plate pad 112 by the sensors 116. The sensor 116 may sense the input plate pad 112 within a range of distances from the sensors 116 and may provide a range of signal strengths based on the distance between the sensors 116 and the input plate pad 112. For example, the sensors 116 may be configured to provide a simple binary signal or may provide an analog-style output based on the distance between the sensors 116 and the input plate pad 112.

In operation, a user may provide inputs to the user-interface device 100 through touch inputs applied to the cover 122. The touch inputs cause the input plate pad 112 to be moved toward the sensor pad 110 and to at least partially compress the compressible layer 120. Movement of the input plate pad 112 into sufficiently close proximity to the sensors 116 enables sensing of the input plate pad 112 by one or more of the sensors 116.

Figure 7:
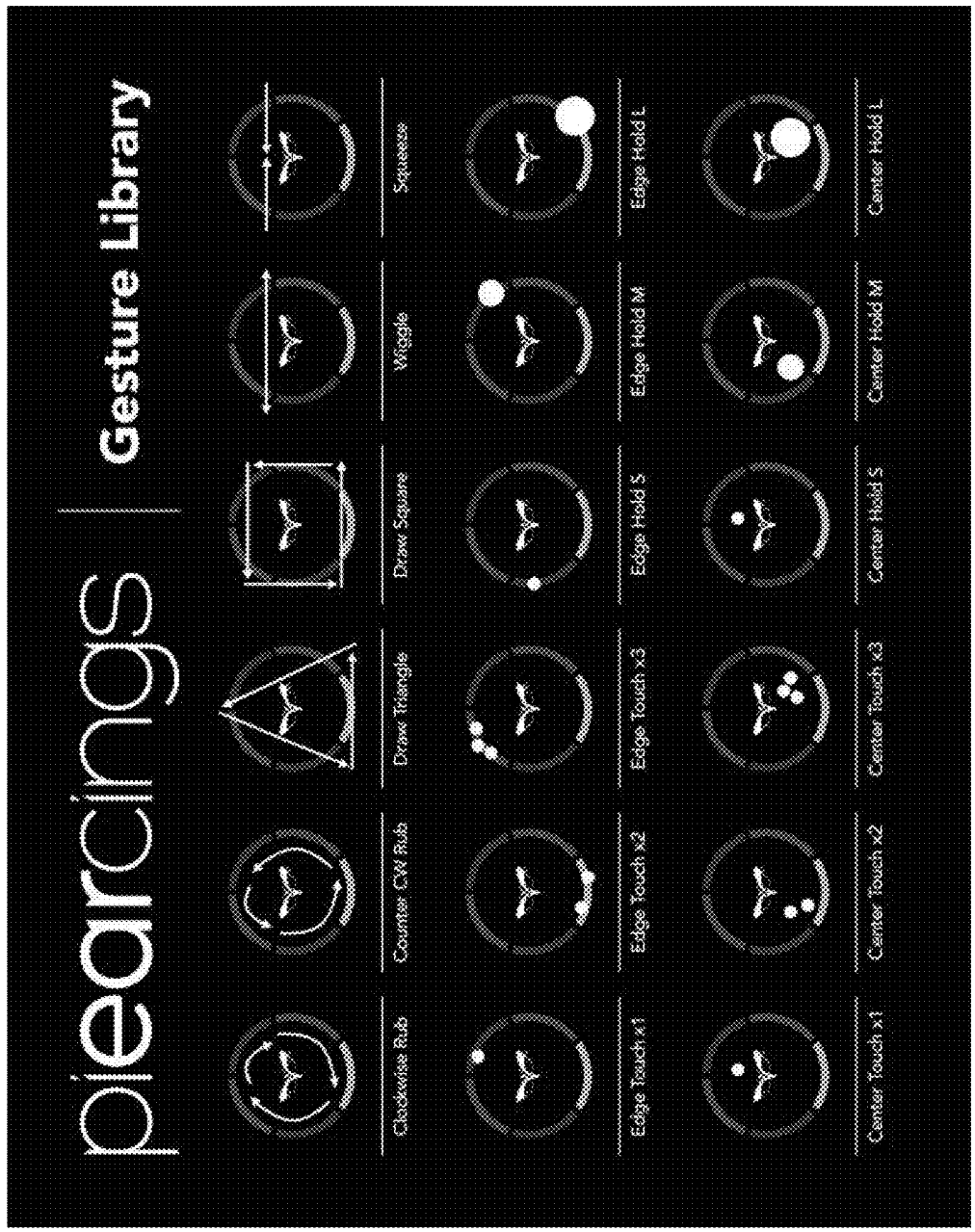
FIG. 7 is a chart depicting a variety of touch-based inputs that are useable and recognizable by a user interface in accordance with an exemplary embodiment.

Depending on the location and force of the touch input applied to the cover 122, the input plate pad 112 may be tilted relative to the sensor pad 110 such that the sensors 116 in the array do not all sense the same proximity between the input plate pad 112 and the sensor pad 110. For example, a touch input force applied to one side of the input plate pad 112 may tilt one side of the input plate pad 112 toward the sensor pad 110 and thus only sensors 116 along that respective side of the sensor pad 110 sense the input plate pad 112. Similarly, a touch input may move across the cover 122 in a swiping or other motion, such as one or more of those depicted in FIG. 7. Such a motion will initially pivot the input plate pad 112 in one direction and then change the pivot of the input plate pad 112 as the input swipes across the cover 122. The sensors 116 that sense the input plate pad 112 and/or the degree of proximity sensed thereby will thus change as the input motion moves across the cover 122. In one embodiment, the input plate pad 112 may be at least partially flexed or bent by the force of the touch input.

Another input may be indicated by a duration of an input touch on the cover 122 or by an amount or degree of force applied, e.g. a soft press versus a hard press. A soft press might be indicated by one or more of the sensors 116 sensing the input plate pad 112 but at a distance or proximity that is at an outer bound or range. A hard press might be indicated by a greater number of sensors 116 sensing the input plate pad 112 or by the sensors 116 sensing a close or minimum proximity between the sensors 116 and the input plate pad 112.

The sequences and/or strengths of inputs received from the sensors 116 may be correlated or mapped to a variety of input commands which may be employed by devices coupled to the user interface device 100 to instruct operation thereof. For example, a swipe input may be mapped to a command to move to a next or previous audio track to be played, or a hard press might be mapped to a command to open a personal assistant program, among a large variety of other commands.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A user-interface device comprising:
   a printed circuit board having a central pad, a first satellite pad, a second satellite pad, and a third satellite pad, the first, second, and third satellite pads being coupled to the central pad by respective flexible arms and being folded onto the central pad in a layered arrangement;
   a control board disposed on the central pad and communicably coupled to a computing device to provide input signals to the computing device,
   a base plane forming an electrically conductive ground plane on the first satellite pad;
   a sensor array including a plurality of sensors disposed on the second satellite pad; and
   an input plate including an electrically conductive material disposed on the third satellite pad.

2. The user-interface device of claim 1, further comprising:
   a dielectric material disposed between the ground plane on the first satellite pad and the sensors on the second satellite pad.

3. The user-interface device of claim 1, further comprising:
   a cushion disposed between the second satellite pad and the third satellite pad, the cushion being compressible to enable the input plate to be moveable toward the sensors on the second satellite pad upon application of a force on the third satellite pad by a user.

4. The user-interface device of claim 3, wherein the cushion comprises a foam material.

5. The user-interface device of claim 3, wherein the cushion comprises a neoprene material.

6. The user-interface device of claim 1, wherein the plurality of sensors on the second satellite pad are arranged in a ring spaced about a perimeter of the second satellite pad.

7. The user-interface device of claim 6, wherein the sensor array includes a second sensor disposed within a central portion of the ring of sensors.

8. The user-interface device of claim 1, wherein the sensors on the second satellite pad comprise capacitive sensors.

9. The user-interface device of claim 1, wherein input plate is rigid.

10. The user-interface device of claim 1, wherein the input plate is at least partially flexible to allow partial temporary deformation of the input plate upon application of a force by a user.

11. The user-interface device of claim 1, further comprising:
    a cover disposed to overlie the input plate, the cover being at least partially flexible to enable movement of the input plate of the third satellite pad toward the second satellite pad upon application of a force by a user on the cover.

12. A user-interface device comprising:
    a printed circuit board having a central pad, a first satellite pad, a second satellite pad, and a third satellite pad, the first, second, and third satellite pads being coupled to the central pad by respective flexible arms, the arms being folded to arrange the first, second, and third satellite pads on the central pad in a layered arrangement;
a control board disposed on the central pad and communicably coupled to a computing device to provide input signals to the computing device,
a base plane pad forming an electrically conductive ground plane on the first satellite pad;
a sensor array including a plurality of capacitive sensors disposed on the second satellite pad;
an input plate including an electrically conductive material disposed on the third satellite pad;
a compressible cushion layer disposed between the input plate and the sensor array; and
a cover disposed to overlie the input plate, the cover being at least partially flexible to enable movement of the input plate of the third satellite pad toward the second satellite pad upon application of a force by a user on the cover.

13. The user-interface device of claim 12, wherein the cover comprises a portion of an exterior surface of a body of an electronic device in which the user-interface device is disposed.

14. The user-interface device of claim 12, wherein the sensor array is configured to detect a location of a force applied by a user on the cover.

15. The user-interface device of claim 12, wherein the sensor array is configured to detect a magnitude of a force applied by a user on the cover.

16. The user-interface device of claim 12, wherein the input plate is normally oriented parallel to and spaced apart from the sensor array, and wherein the input plate is tilted relative to the sensor array by a force applied by a user on the cover, and at least a portion of the input plate is moved toward the sensor array.

\* \* \* \* \*